United States Patent [19]

Wehrfritz et al.

[11] Patent Number: 4,565,378
[45] Date of Patent: Jan. 21, 1986

[54] SHAFT SEAL WITH LIP LIFTING IN RESPONSE TO SHAFT ROTATION AND GAS PRESSURE

[75] Inventors: Heinz Wehrfritz, Kalchreuth; Michael Brunke, Nuremberg, both of Fed. Rep. of Germany

[73] Assignee: GMN Georg Muller Nurnberg GmbH, Fed. Rep. of Germany

[21] Appl. No.: 682,375

[22] Filed: Dec. 17, 1984

[30] Foreign Application Priority Data

Dec. 21, 1983 [DE] Fed. Rep. of Germany ....... 3346073

[51] Int. Cl.⁴ .................... F16J 15/32; F16J 15/34; F16J 15/46
[52] U.S. Cl. .................................... 277/3; 277/1; 277/25; 277/27; 277/95; 277/152; 277/53
[58] Field of Search .................. 277/1, 3, 27, 25, 152, 277/153, 95, 53

[56] References Cited

U.S. PATENT DOCUMENTS

| | | | |
|---|---|---|---|
| 2,326,824 | 8/1943 | Browne et al. | 277/3 |
| 2,418,707 | 4/1947 | Groot | 277/25 |
| 3,088,744 | 5/1963 | Ezekiel et al. | 277/3 |
| 4,204,689 | 5/1980 | Johansson | 277/27 |

FOREIGN PATENT DOCUMENTS

| | | | |
|---|---|---|---|
| 2554840 | 6/1976 | Fed. Rep. of Germany | 277/95 |
| 1123765 | 6/1956 | France | 277/95 |
| 695855 | 8/1953 | United Kingdom | 277/95 |

Primary Examiner—Robert S. Ward
Attorney, Agent, or Firm—Steinberg & Raskin

[57] ABSTRACT

Apparatus for effecting a seal between a rotary shaft and its enclosure includes a sealing element having an elastic lip portion coupled to the shaft for rotation therewith and a sealing portion associated with the enclosure, the elastic lip portion forming a contact seal with the sealing portion when the shaft is stationary or rotating slowly. The elastic lip portion tends to lift from the sealing portion to form a non-contact seal upon a predeterminable increase in the rate of shaft rotation. Compressed gas is introduced into a region between the rotary elastic lip portion and the sealing portion to form a gas cushion therebetween to facilitate lifting of the elastic lip portion.

9 Claims, 1 Drawing Figure

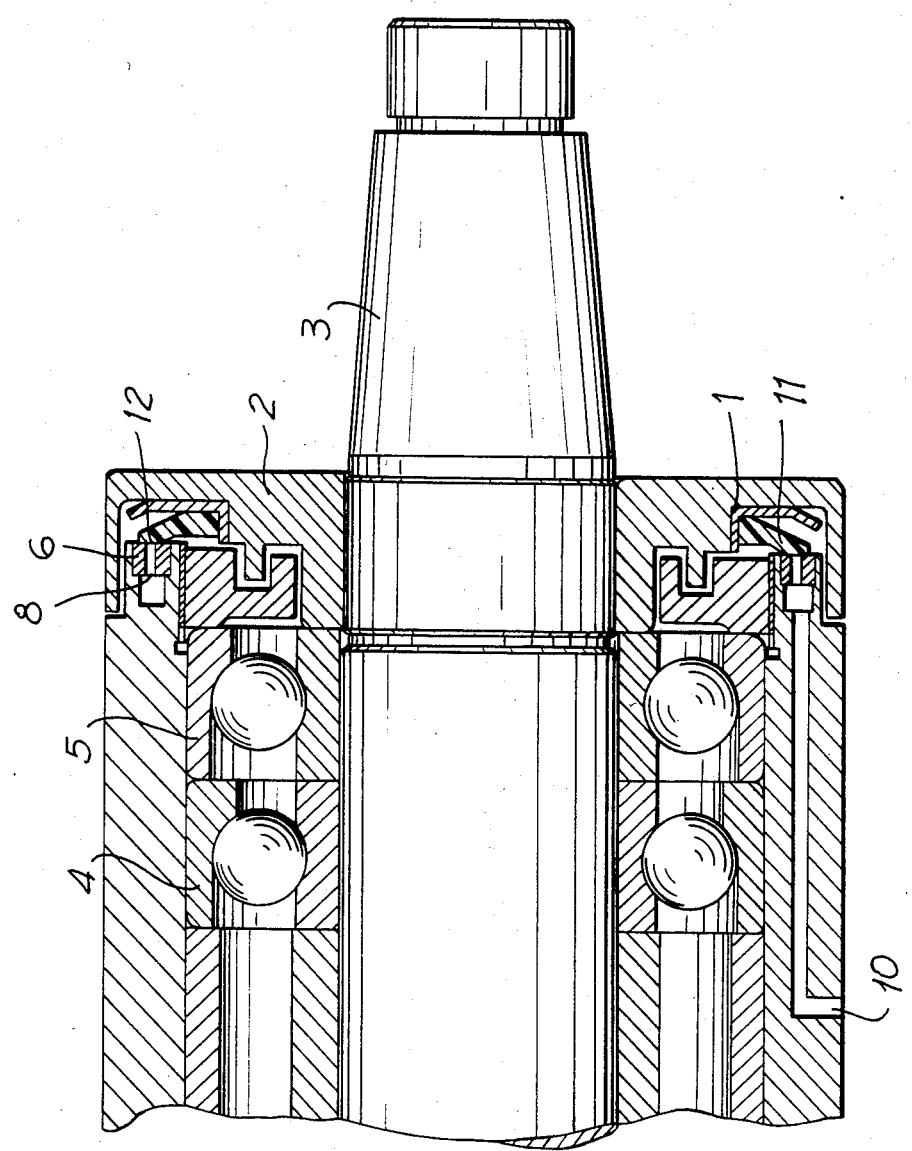

SHAFT SEAL WITH LIP LIFTING IN RESPONSE TO SHAFT ROTATION AND GAS PRESSURE

BACKGROUND OF THE INVENTION

This invention relates generally to various types of seal arrangements. Such seals generally are utilized in spindles for sealing the gap between a fixed outer housing or enclosure and a rotatably mounted shaft extending through and from the housing. Most spindle arrangements can operate over a wide range of applications without breaking down and for long periods of time only if protected by effective sealing arrangements during their service life whereby dirt, liquids and other contaminants are prevented from penetrating into the shaft housing. It is also important in many applications to prevent lubricants from escaping from within the shaft housing.

A multitude of different designs of shaft seals are known and described in standard engineering and production literature. Such shaft seals are generally classified as either contacting or non-contacting.

Contacting seals refer to seals wherein sealing surfaces rub against the rotating machine component with a predetermined pressure and are usually used in sealing against the penetration of foreign substances into the spindle housing. However, due to the contact pressure which exists and the frictional heat generated thereby, the use of these bearings at high speeds is somewhat limited. Thus, contact bearings tend to lose their effectiveness either through wear due to friction or through the heat generated by the sliding contact. The increases in temperature caused by the frictional sealing contact additionally affects adjacent machine components such as the bearings in which the shaft is mounted or even the entire spindle system.

The service life of bearings and lubricants is significantly reduced when the bearings operate at high temperatures.

The maximum possible peripheral speed of contacting seals of various designs is limited depending upon the structural shape and materials of these seals as well as the environmental conditions under which the seals operate. The lubrication and construction of the sealing lip on which the rotating sealing surface is provided also affects the range of speed over which the bearing is operable.

Generally, the upper limit of peripheral speed for a contacting seal is about 30 m/s. At such high speeds, the temperatures to which the bearing surfaces are subjected due to the friction created by the contacting seal results in heating of the bearing and spindle system and in consequence dimensional changes which may substantially impair the accuracy and operation of the machine.

Non-contacting seals have therefore been used in high-speed spindles. Such non-contacting seals have very narrow, smooth, radial or axial gaps, or so-called labyrinth gaps. However, such non-contacting seals cannot function over wide ranges of application.

Usually, in addition to the non-contact seal construction, a shield disc is fixed to the shaft in front of the non-contacting seal. A shield disc rotates with the shaft and thus prevents the entry of dirt and liquid into the housing by centrifugal force. The effect of this on a non-contacting seal which is generally determined by the length of the sealing gap or the number of labyrinths is often quite limited due to the small area available in which the spindle is to be mounted. In order to obtain a rigid spindle the distance between the outer point at which the forces are applied to the end of the spindle shaft and the bearing point at which the shaft is supported in the beaaring must be as short as possible.

In certain applications significant amounts of possible contaminants are present during rotation of a rotating spindle shaft. For example, in grinding operations liquid coolant and substantial material waste are present during the grinding process. In such applications it is not uncommon to use a gaseous medium, for example compressed air alone or with an oil mist entrained therein, to intensity the sealing effect. If, however, the supply of compressed air is terminated when the equipment operation stops, coolant or other contaminants from the working area may enter into the spindle housing and through the sealing gap or labyrinth seal.

The penetration of coolant into the spindle housing is also possible when the spindle shaft rotataes at relatively low speeds since the centrifugal force acting on the shield disc is not very effective. The danger is especially prevalent if there is a failure in the supply of the compressed sealing air.

Particularly in connection with modern high-speed cutting techniques for metallic materials as well as wood, stone and semiconductor substrate processing for electronics applications, very large quantities of coolant must be present in the tool contact zone to dissipate the heat generated during cutting and to facilitate the discharge of chips. The large quantity of coolant, which frequently must be supplied under high pressure, requires an improved sealing of the workpiece spindle against the penetration of the coolant and other contaminants.

SUMMARY OF THE INVENTION

It is an object of the present invention to provide a new and improved method and apparatus for effecting a seal between components which rotate relative to each other such, for example as a spindle including a housing in which a rotatable shaft is mounted.

Another object of the present invention is to provide a new and improved method and apparatus for effecting a shaft seal which will prevent coolant from penetrating into the spindle housing during operation as well as during periods of non-operation.

Another object of the present invention is to provide new and improved method and apparatus for effecting a shaft seal which provides a hermetic seal when the shaft rotates at low speeds and which acts as a non-contacting seal at medium to maximum speeds.

Briefly, in accordance with the present invention these and other objects are attained by providing a sealing element mounted on the rotary machine element for rotation therewith and which includes an elastic lip portion having a sealing surface which bears with pressure on a sealing surface associated with the other machine component and wherein the sealing pressure decreases as the peripheral speed of the elastic lip portion increases with increasing speed of shaft rotation. The sealing pressure is eventually neutralized or eliminated under the action of centrifugal forces.

In order to facilitate lifting or disengagement of the sealing surface of the elastic lip portion from the stationary sealing surface and/or to effect such disengagement at a desired lower peripheral speed, an arrangement is provided for introducing compressed gas, such as compressed air, into the region between the rotary elastic lip portion and the stationary sealing surface to thereby form a gas cushion therebetween. In an illustrated embodiment, a plurality of bores are formed through a ring-shaped sealing member associated with the fixed spindle housing, the bores being substantially mutually spaced from each other around the ring-shaped sealing member.

As used herein, the stationary sealing surface of the sealing portion associated with the non-rotating machine component is constituted by that area which is engaged by the sealing surface of the elastic lip portion which rotates with the rotary machine component. In the illustrated embodiment, the plurality of bores through which the compressed gas is introduced open onto the fixed sealing surface which is completely covered by the sealing surface of the elastic lip.

The air cushion created in the manner described above is particularly suited for regulating the time at which the elastic lip is lifted from the sealing surface of the non-rotating machine component of the spindle. In this manner, an effective seal is insured at both low and high speeds of rotation without affecting the properties of the spindle. When operation of the spindle is terminated, its interior is reliably protected against the penetration of dirt, liquid or other contaminants by the contact seal regardless of whether compressed gas is introduced.

DETAILED DESCRIPTION OF THE DRAWING

A more complete appreciation of the present invention and many of the attendant advantages thereof will be readily understood by reference to the following detailed description when considered in connection with the accompaying FIGURE, which is a transverse section view of a spindle incorporating an elastic axial shaft seal in accordance with the present invention.

DESCRIPTION OF THE PREFERRED EMBODIMENT

Referring now to the FIGURE, a spindle 20 comprising a shaft 3 rotatably mounted in a housing or enclosure 22 by means including bearings 4 and 5 and incorporating seal apparatus in accordance with the invention is illustrated. A shield disc 2 is fixed to shaft 3 and has an inner surface which engages the upper bearing 5 to hold the bearings in place. An inner labyrinth seal is formed by an annular flange 2a projecting inwardly from shield disc 2 situated within an annular channel 24 formed in a member 26 fixed to housing 22.

An axial shaft seal 1 is fixed to an inner cylindrical surface portion of shield disc 2. The axial shaft seal 1 includes a sealing lip 11 formed of elastic material and which terminates at an annular first sealing surface 12. A ring-shaped sealing member 6 is fixed to housing 22 and has an upper surface which constitutes a second sealing surface 26 against which the first sealing surface 12 of sealing lip 11 bears with a sealing pressure.

The ring-shaped sealing member 6 is formed with a plurality of small diameter through-bores 8 which are substantially mutually equally spaced from each other around the ring-shaped sealing member. One end of each of the bores 8 opens into an annular chamber 28 which communicates through a connecting passage 10 with a source of compressed gas. The other end of each of the bores 8 opens onto the second sealing surface 26 against which the first sealing surface 12 of elastic sealing lip 11 normally bears.

In operation, when the shaft is stationary or rotating at relatively low speeds, the first sealing surface 12 of elastic sealing lip 11 bears with a sealing pressure against the second sealing surface 26 of the ring-shaped sealing member 6 to thereby form a contact seal. As the speed of the shaft rotation increases, the speed at which the axial shaft seal 1 and the elastic sealing lip 11 thereof correspondingly increase by virtue of a coupling to shaft 3 through the shield disc 2. The centrifugal forces acting at the elastic sealing lip 11 thereby increases which tends to move the sealing lip 11 and first sealing surface 12 thereof radially outwardly. At the same time, the bearing pressure of the first sealing surface 12 of sealing lip 11 on the second sealing surface 26 of the sealing member 6 diminishes until it reaches zero whereupon the sealing lip 11 lifts off from the second sealing surface 26.

According to the invention, the lifting of the first sealing surface 12 from the second sealing surface 26 is facilitated by means of the introduction of compressed gas, such as compressed air, into a region between rotary elastic lip portion 11 and the second sealing surface to thereby form a gas cushion at the sealing surfaces between the seal 1 and the sealing surface 26 and counterbalances the bearing force of the sealing lip 11. The moment at which the sealing lip 11 is lifted from the second sealing surface 26 can thus be selectively adjusted so as, for example, to occur at lower speeds than at which such lifting would otherwise occur without the assistance of the introduction of compressed air. In the same manner, the friction in the transition region can be minimized. An effective seal is thus achieved at both high and low speeds of shaft rotation. At the same time an effective seal is provided with the shaft stationary or rotation at slow speeds, such seal being sufficient to protect the spindle against the penetration of cooling liquid and the like.

The compressed gas is introduced through the connecting passage 10 to the annular chamber 28 and through the plurality of bores 8. It is understood, however, that other arrangement may be utilized. For example, the compressed air can be introduced through a small gap below the bearing surface of the elastic lip 11 which will cause the lip to be lifted as described above. Another possibility is that the ring-shaped sealing member 6 may be formed of a porous sintered material which is penetrable by air. In any event, it is understood that the compressed gas will be introduced at the sealing surface which is covered by the sealing surface of the elastic lip.

The purpose of the inner labyrinth seal is to insure the greatest possible resistance to the penetration of compressed air into the interior of the spindle. Additionally, the labyrinth seal prevents escape of the bearing lubricants. The exhausting compressed gas will afford sufficient protection against the penetration of solid contaminants from the outside of the spindle, thereby protecting the elastic sealing lip from wear.

It will be understood that although the present invention is illustrated in the preferred embodiment as forming a part of an axial shaft seal, the invention can be utilized with a radial shaft seal. In such a case, the radial shaft seal is fixed on the rotating machine component and compressed air is supplied through a ring-shaped sealing member provided with a plurality of bores between the contact surface of one or more sealing lips and the non-rotating cylindrical bearing surface, thereby creating air cushions which can selectively adjust the time at which the sealing lip is lifted from the sealing surface.

It is important that in all embodiments of the invention, the air passages through which the compressed gas is introduced are covered by the sealing surface of the rotary shaft seal since this will insure an even lifting of the sealing lip upon admission of the compressed gas.

It is well within the skill of the art to design a ring-shaped sealing member to include a suitable number of bores in the case where such a construction is used, the bores being appropriately spaced to insure an even lifting of the sealing surface of the elastic lip i its entirety from the opposed sealing surface.

Obviously, numerous modifications and variations of the present invention are possible in the light of the above teachings. It is therefore to be understood that within the scope of the claims appended hereto, the invention may be practiced otherwise than is specifically disclosed herein.

What is claimed is:

1. Apparatus for effecting a seal between a first rotary machine component and a second machine component comprising:
    a sealing element coupled to said first machine component for rotation therewith, said sealing element including an elastic lip portion having a first sealing surface;
    a sealing portion associated with said second machine component, said sealing portion having a second sealing surface adapted to form a seal with said first sealing surface;
    said first sealing surface of said elastic lip portion forming a contact seal with said second sealing surface over a region of mutual engagement when said first machine component is stationary or rotating slowly with respect to said second machine component, said first sealing surface of said elastic lip portion tending to lift from said second sealing surface to form a non-contact seal upon a predeterminable increase in the rate at which said first machine component rotates with respect to said second machine component; and
    means for introducing compressed gas into a region between said rotary elastic lip portion and said second sealing surface to form a gas cushion therebetween to facilitate lifting of said first sealing surface from said second sealing surface.

2. The combination of claim 1 wherein said sealing portion associated with said second machine component comprises a ring-shaped sealing member fixed to said second machine component, and wherein said means for introducing compressed gas includes a plurality of air passages formed in said ring-shaped sealing member, said air passages opening onto said second sealing surface.

3. The combination of claim 1 wherein said sealing portion associated with said second machine component comprises a ring-shaped sealing member fixed to said second machine component, and wherein said means for introducing compressed gas includes a plurality of bores formed through said ring-shaped sealing member, each of said bores opening onto said second sealing surface.

4. The combination of claim 3 wherein said bores are substantially mutually equally spaced from each other around said ring-shaped sealing member.

5. The combination of claim 1 wherein said first rotary machine component comprises a shaft, a shield disc being affixed to said shaft for rotation therewith, said sealing element being fixed to said shield disc.

6. The combination of claim 5 wherein said shield disc forms a labyrinth seal with a labyrinth member fixed to said second machine component.

7. The combination of claim 1 wherein compressed air is introduced into said region between said rotary elastic lip portion and said second sealing surface only during initial start-up rotation of said first machine component or during rotation of said first machine component at a slow rate.

8. Method for effecting a seal between a first rotary machine component and a second machine component including a sealing element coupled to said first machine component for rotation therewith, said sealing element including an elastic lip portion having a first sealing surface, a sealing portion associated with said second machine component, said sealing portion having a second sealing surface adapted to form a seal with said first sealing surface; said first sealing surface of said elastic lip portion forming a contact seal with said second sealing surface over a region of mutual engagement when said first machine component is stationary or rotating slowly with respect to said second machine component, said first sealing surface of said elastic lip portion tending to lift from said second sealing surface to form a non-contact seal upon a predeterminable increase in the rate at which the first machine component rotates with respect to the second machine component, comprising the step of:
    introducing compressed gas into a region between said rotary elastic lip portion and said second sealing surface to form a gas cushion therebetween to facilitate lifting of said first sealing surface from said second sealing surface.

9. The method of claim 8 wherein said compressed gas is introduced into said region only during initial start-up of rotation of said first machine component or during rotation of said first machine component at a slow rate.

* * * * *